United States Patent Office 3,102,107
Patented Aug. 27, 1963

3,102,107
STABILIZATION OF POLYPROPYLENE WITH NICKEL SALTS OF AMINO ACIDS
Mary Lou Soeder, Newark, Del., assignor to Hercules Powder Company, Wilmington, Del., a corporation of Delaware
No Drawing. Filed Oct. 10, 1960, Ser. No. 61,368
5 Claims. (Cl. 260—45.75)

The present invention relates to polyolefin compositions and, more particularly, to the stabilization of stereoregular polymers of propylene and higher α-olefins against degradation by light.

Highly crystalline, high molecular weight stereoregular polymers of propylene and higher α-olefins are well known. One of the deficiencies of such polymers which must be overcome to enable their use in many applications is poor stability against the deleterious effect of light.

In accordance with the present invention it has been found that the stereoregular polymers of propylene and higher α-olefins can be stabilized very effectively against the deleterious effects of light by incorporating in such polymers a small amount of a nickel salt of an α-aminocarboxylic acid having the formula

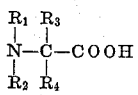

wherein $R_1$ and $R_2$ are selected from the group consisting of hydrogen, hydrocarbon and carboxyalkyl radicals, $R_3$ and $R_4$ are selected from the group consisting of hydrogen and hydrocarbon radicals, and in which $R_1$ and $R_3$ can together comprise a hydrocarbon radical cyclically connecting the nitrogen atom and the α-carbon atom of the formula and $R_1$ and $R_2$ can together comprise a hydrocarbon radical cyclically bound to the nitrogen atom of the formula.

Although any stereoregular polymer of a mono-α-olefin having at least 3 carbon atoms can be stabilized by means of the invention, the invention is particularly useful in stabilizing stereoregular polymers of monoolefins having from 3 to 6 carbon atoms including, for instance, polypropylene, poly(butene-1), poly(pentene-1), poly(3-methylbutene-1), and poly(4-methylpentene-1).

The nickel salts of α-aminocarboxylic acids used as additives in accordance with the invention increase the light stability of stereoregular polypropylene and related stereoregular polymers quite markedly. An even further increase in light stability can be achieved, however, by also incorporating a phenolic compound in the polymer. In fact, such outstanding light stability is obtained that it makes these stereoregular polymers usable for many applications requiring prolonged outdoor exposure.

The nickel salts that are used for the stabilization of stereoregular polymers in accordance with the invention can be made by methods known in the art. The most common method comprises reacting a basic nickel compound with the α-aminocarboxylic acid to produce the desired nickel salt by direct synthesis.

In the previously assigned formula, the permissible R substituents are numerous and varied. Each of $R_1$, $R_2$, $R_3$ and $R_4$ can be hydrogen or a hydrocarbon radical, and, in addition, $R_1$ and $R_2$ can be carboxyalkyl radicals. Also, $R_1$ and $R_3$ can together comprise a hydrocarbon radical forming a ring with the nitrogen and α-carbon atom of the formula or $R_1$ and $R_2$ can together comprise a hydrocarbon radical forming a ring with the nitrogen atom of the formula. Typical hydrocarbon radicals that the R substituents can comprise are alkyl, aryl, cycloalkyl, aralkyl and alkaryl radicals such as methyl, ethyl, propyl, butyl, decyl, octadecyl, phenyl, cyclohexyl, benzyl, tolyl and similar radicals. Typical carboxyalkyl radicals that $R_1$ and $R_2$ can comprise are carboxymethyl and carboxyethyl. Suitable α-aminocarboxylic acids from which the nickel salts can be prepared include glycine, alanine, valine, norvaline, leucine, norleucine, isoleucine, isovaline, phenylalanine, aspartic acid, glutamic acid, proline, sarcosine, N-benzylglycine, N-cyclohexylglycine, N,N-dimethylglycine, N-octadecylglycine, N-octadecyliminodiacetic acid, iminodicacetic acid, N,N-diethylglycine, N-carboxymethyl piperidine, and the like.

The invention will be illustrated by the following examples in which parts and percentages are by weight unless otherwise specified.

EXAMPLE 1

In this example stereoregular polypropylene having a birefringent melting point of about 168° C. and a reduced specific viscosity of 3.5 (measured on a 0.1% solution of decahydronaphthalene at 135° C.) was thoroughly blended with 0.5%, based on the amount of polypropylene, of nickel glycinate. The blend was extruded into molding powder at 215–220° C. and the molding powder was then pressed into sheets 25 mils thick. Strips cut from these sheets, and 0.5 inch wide, were fastened onto pieces of white cardboard and placed in a Fade-Ometer. Another series of strips was exposed to outdoor weathering in Miami, Florida, at a 45° angle facing south. In both the Fade-Ometer exposure and the outdoor exposure, the development of brittleness in each strip was observed by periodically examing the strip and noting the time elapsed until it became brittle, the embrittlement point being the time elapsed until a strip breaks when bent double. Exposure data are as follows:

Table 1

|  | Embrittlement Time | |
| --- | --- | --- |
|  | Fade-Ometer | Outdoors |
| Control (no stabilizer) | 24 Hours | 1 Week. |
| Stabilized Polymer | 160 Hours | 1½ Months. |

EXAMPLE 2

The same procedure as in Example 1 was followed except in this case the polymer additionally contained 0.5% of the reaction product of 2 moles of nonylphenol and 1 mole of acetone, the reaction product comprising a mixture of isopropylidene-bis-(nonylphenol) and 2(2'-hydroxyphenyl)-2,4,4-trimethyl-5',6-dinonylchroman. The embrittlement time in Fade-Ometer exposure was lengthened to 236 hours by the addition of the phenolic additive and the embrittlement time in outdoor exposure was increased to 2½ months by the addition of the phenolic ingredient.

EXAMPLES 3 TO 9

Various other nickel salts of α-aminocarboxylic acids were evaluated in the manner of Example 2 in the amount of 0.5% and found to give embrittlement times in Fade-Ometer exposure several times that of the control sample. The nickel salts were as follows:

Table 2

Nickel salt of—
- (3) α-Picolinic acid
- (4) Sarcosine
- (5) N,N-dimethylglycine
- (6) N,N-dilaurylglycine
- (7) Methylamine-N,N-diacetic acid
- (8) Proline
- (9) N-phenylglycine The amount of the nickel salt incorporated in the polymer can be varied from a very small amount up to several percent. More specifically, beneficial results are normally obtained when it is employed in an amount from 0.01% to about 5% by weight of the polymer.

As previously mentioned, one of the preferred, but optional, modifications of the invention comprises incorporating into the polymer a phenolic compound in addition to the nickel salt. The phenolic compound, when used, preferably comprises from 0.01 to 5% by weight of the polymer. Suitable phenolic compounds that are useful in this embodiment include alkyl phenols, bis-phenols, terpene phenols, aralkyl phenols, and polyalkylchromans. Typical alkyl phenols that can be used include di-tert-butyl-p-cresol, o-nonylphenol, o,o-diisopropylphenol, etc. Bisphenols that are useful include 2,2'-methylene-bis-(5-isopropylphenol),
2,2'-methylene-bis-(4-methyl-6-isopropylphenol),
2,2'-methylene-bis-(4-methyl-6-tert-butylphenol),
2,2'methylene-bis-(4-tert-butyl-6-methylphenol),
2,2'-methylene-bis-(4,6-di-tert-butylphenol),
2,2'-methylene-bis-(4-nonylphenol),
2,2'-methylene-bis-(4-decylphenol),
4,4'-methylene-bis-(2,6-di-tert-butylphenol),
4,4'-methylene-bis-(2-methyl-6-tert-butylphenol),
2,2'-ethylidene-bis-(4-methyl-6-tert-butylphenol),
2,2'-ethylidene-bis-(4,6-di-tert-butylphenol),
2,2'-ethylidene-bis-(4-octylphenol),
2,2'-ethylidene-bis-(4-nonylphenol),
2,2'-isopropylidene-bis-(4-methyl-6-isopropylphenol),
2,2'-isopropylidene-bis-(4-isopropylphenol),
2,2'-isopropylidene-bis-(4-isopropyl-6-methylphenol),
2,2'-isopropylidene-bis-(4-methyl-6-tert-butylphenol),
2,2'-isopropylidene-bis-(4-octylphenol),
2,2'-isopropylidene-bis-(4-nonylphenol),
2,2'-isopropylidene-bis-(4-decylphenol),
2,2'-isobutylidene-bis-(4-methyl-6-tert-butyl-phenol),
2,2'-isobutylidene-bis-(4-nonylphenol), etc.

Polyalkyl chromans that can be employed include

2(2'-hydroxyphenyl)-2,4,4,5',6-pentamethylchroman,
4(2'-hydroxyphenyl)-2,2,4,5',6-pentamethylchroman,
2(2'-hydroxyphenyl)-5',6-diisopropyl-2,4,4-trimethylchroman,
2(2'-hydroxyphenyl)-5',6-diisopropyl-2,4,4,3',8-pentamethylchroman,
2(2'-hydroxyphenyl)-5',6-di-tert-butyl-2,4,4-trimethylchroman,
4(2'-hydroxyphenyl)-5',6-di-tert-butyl-2,2,4-trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman,
2(2'-hydroxyphenyl)-5',6-didecyl-2,4,4-trimethylchroman, etc.

Terpene phenols useful in this modification are reaction products of a terpene and a phenol as exemplified by 2,6-diisobornyl-p-cresol, 2,4-dimethyl-6-isobornylphenol, and similar products made by condensing phenol or an alkylphenol with a cyclic unsaturated terpene or dihydroterpene, e.g., camphene, carvomenthene, dipentene, α-pinene and the like.

The composition of the invention can also contain one or more additives in addition to those already mentioned. Such other additives include, for instance, pigments, dyes, antacids, fillers, and the like.

What I claim and desire to protect by Letters Patent is:

1. A stereoregular polymer of an α-olefin having from 3 to 6 carbon atoms containing as a light stabilizer therefor a small amount of a nickel salt of an α-aminocarboxylic acid having the formula

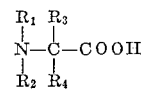

wherein $R_1$ and $R_2$ are radicals selected from the group consisting of hydrogen, hydrocarbon and carboxyalkyl radicals, $R_3$ and $R_4$ are radicals selected from the group consisting of hydrogen and hydrocarbon radicals, and $R_1$ and $R_3$ can together comprise a hydrocarbon radical cyclically connecting the nitrogen atom and the α-carbon atom of the formula.

2. The composition of claim 1 in which the nickel salt is nickel glycinate.

3. The composition of claim 1 in which the nickel salt is that of N,N-dilaurylglycine.

4. The composition of claim 1 containing also a small amount of a phenolic compound.

5. The composition of claim 1 in which the polymer is polypropylene.

References Cited in the file of this patent

UNITED STATES PATENTS

| | | |
|---|---|---|
| 2,135,641 | Jacobson | Nov. 8, 1938 |
| 2,615,860 | Burgess | Oct. 28, 1952 |
| 2,665,265 | Burgess | Jan. 4, 1954 |
| 2,935,617 | Salyer et al. | May 23, 1961 |